(12) United States Patent
Driller

(10) Patent No.: US 6,743,089 B2
(45) Date of Patent: Jun. 1, 2004

(54) AIR-GUIDING NOZZLE

(75) Inventor: Sönke Driller, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/422,584

(22) Filed: Apr. 24, 2003

(65) Prior Publication Data

US 2003/0211821 A1 Nov. 13, 2003

Related U.S. Application Data

(63) Continuation of application No. PCT/EP01/11691, filed on Oct. 10, 2001.

(30) Foreign Application Priority Data

Nov. 1, 2000 (DE) .......................................... 100 54 555

(51) Int. Cl.$^7$ ................................................ B60H 1/34
(52) U.S. Cl. ...................................... 454/124; 454/155
(58) Field of Search ................................. 454/124, 155

(56) References Cited

U.S. PATENT DOCUMENTS

| 2002/0178744 A1 | * 12/2002 | Tanabe et al. ................ 62/407 |
| 2003/0157880 A1 | * 8/2003 | Nishida et al. ............. 454/155 |
| 2004/0002298 A1 | * 1/2004 | Osada et al. ................ 454/155 |

FOREIGN PATENT DOCUMENTS

| DE | 39 11 615 C3 | 10/1990 | |
| DE | 42 07 670 C1 | 3/1993 | |
| DE | 195 04 737 C2 | 9/1995 | |
| DE | 196 21 371 A1 | 12/1997 | |
| DE | 298 17 513 U1 | 2/1999 | |
| DE | 198 50 989 C1 | 5/2000 | |
| FR | 2 671 520 | 7/1992 | |
| JP | 58-184439 | * 10/1983 | ................ 454/155 |
| JP | 59-38121 | * 3/1984 | ................ 454/124 |

* cited by examiner

Primary Examiner—Harold Joyce
(74) Attorney, Agent, or Firm—Laurence A. Greenberg; Werner H. Stemer; Manfred Beck

(57) ABSTRACT

An air-guiding nozzle has a fixed slat and several parallel pivoting slats. The fixed slat is configured to supply air to a vehicle side window and the pivoting slats are configured to blow air onto a person in the interior of the vehicle. When the pivoting slats are pivoted to their full extent, several of them close the discharge region that blows air onto a person in the interior of the vehicle and at least one of the pivoting slats interacts with the fixed slat such that the discharge region which supplies air to the vehicle side window is enlarged. This allows a compact construction of the air-guiding nozzle, which makes it particularly suitable for integration into the region of the B-pillar above the door ledge of a motor vehicle.

11 Claims, 2 Drawing Sheets

AIR-GUIDING NOZZLE

CROSS-REFERENCE TO RELATED APPLICATION

This application is a continuation of copending International Application No. PCT/EP01/11691, filed Oct. 10, 2001, which designated the United States and was not published in English.

BACKGROUND OF THE INVENTION

Field of the Invention

The invention relates to an air-guiding nozzle for defrosting side windows and ventilating the interior of a motor vehicle. The air-guiding nozzle has at least one fixed slat and a plurality of pivoting slats which can be pivoted simultaneously about respective longitudinal axes.

An air-guiding nozzle of this type is disclosed in German Patent No. DE 42 07 670 C1. This nozzle has an air outlet region divided into an upper and a lower outlet zone. A first set of fixed slats, which are parallel to one another and spaced apart from one another, is disposed at the upper outlet zone. A second set of pivoting slats, which are parallel to one another and spaced apart from one another and can pivot about their longitudinal axis, is disposed at the lower outlet zone. The pivoting slats are assigned an adjusting element for setting a freely selectable pivot angle. The fixed slats and the pivoting slats are arranged parallel to the line of separation between the outlet zones and are situated in a common plane. In a plane parallel thereto, further pivoting slats are distributed at a parallel distance uniformly over the upper and lower outlet zones in a manner such that they can pivot about their longitudinal axes, the further pivoting slats extending transversely to the fixed and pivoting slats and being adjustable in their pivoting position through the use of at least one further adjusting element in the form of a slide.

The air-guiding nozzle disclosed in German Patent No. DE 42 07 670 C1 needs a relatively large amount of space due to its two outlet zones which are used, firstly, for defrosting the side windows and, secondly, for ventilating the interior of the motor vehicle. It is therefore not suitable for installation sites offering a small amount of space, such as, for example, in the region of the B-pillar above the door ledge of a motor vehicle.

SUMMARY OF THE INVENTION

It is accordingly an object of the invention to provide an air-guiding nozzle which overcomes the above-mentioned disadvantages of the heretofore-known air-guiding nozzles of this general type and which can be used in two discharge regions which can be realized at the same time, such that one of the discharge regions can be used for eliminating condensation and defrosting a vehicle side window and such that the other discharge region can be used for adjustably directing the air flow toward a person in the vehicle interior, and wherein the air-guiding nozzle requires a relatively small amount of space and is suitable, in particular, for installation in the region of the B-pillar above the door ledge of a motor vehicle.

With the foregoing and other objects in view there is provided, in accordance with the invention, an air-guiding nozzle for defrosting a vehicle side window and ventilating a vehicle interior, including:

an air outlet duct having an air outlet;
at least one fixed slat disposed at the air outlet, the at least one fixed slat being configured to define a first discharge region for directing an air flow to a vehicle side window;
a plurality of pivoting slats disposed at the air outlet, the pivoting slats being spaced apart from one another and being disposed substantially parallel to one another, the pivoting slats defining respective longitudinal axes and being simultaneously pivotable about the respective longitudinal axes;
the pivoting slats being configured to define a second discharge region for directing an air flow toward a passenger area;
the pivoting slats being dimensioned and disposed such that given ones of the pivoting slats, when in a maximum pivoting position, close the air outlet duct at the second discharge region; and
at least one of the pivoting slats, when being in a maximum pivoting position, interacting with the at least one fixed slat such that the first discharge region is enlarged.

In other words, the object of the invention is achieved by an air-guiding nozzle for defrosting the side windows and ventilating the interior of a motor vehicle, having an air outlet duct, at the air outlet of which at least one fixed slat and a plurality of pivoting slats, which can be pivoted simultaneously about a respective longitudinal axis, are disposed at a parallel distance from one another, the at least one fixed slat defining a discharge region used for acting upon a vehicle side window, and the pivoting slats being used for directing the flow toward a person in the vehicle interior, wherein the pivoting slats are dimensioned and disposed in such a manner that a plurality of them at maximum pivoting close the air outlet duct in a region used for directing the air flow toward a person in the vehicle interior, and wherein at this maximum pivoting at least one of the pivoting slats interacts with the at least one fixed slat in such a manner that the discharge region used for acting upon the vehicle side window is enlarged.

The air-guiding nozzle according to the invention can be realized in compact dimensions in spite of its two different discharge regions, with the result that it can be installed, in particular, in the region of the B-pillar above the door ledge of a motor vehicle. It is also distinguished in that pivoting of its pivoting slats, which are arranged at the air outlet, into their closing position increases and therefore optimizes the discharge region used for acting upon the side window. This is expedient, in particular in the winter or at low ambient temperature if it is desired to act upon the side window for defrosting purposes or to eliminate condensation or avoid condensation, while it is usually not desirable to direct the flow toward the passengers or cool the passengers when there is a low ambient temperature. On the other hand, the pivoting slats arranged at the air outlet can be pivoted into their open position at high ambient temperature, in particular in summer, so that a flow is directed toward a person in the vehicle interior for cooling purposes. However, the at least one fixed slat still ensures that a flow is directed toward the side window, although the discharge region effective in this case is reduced in size.

A preferred embodiment of the air-guiding nozzle according to the invention is provided in that the pivot axes of the pivoting slats are situated essentially in one plane, with the exception of the pivot axis of the at least one pivoting slat which interacts with the at least one fixed slat. This allows a division of the airflow supplied along the B-pillar into a flow-directing region used for directing the flow toward the side window and into a flow-directing region used for directing the flow toward a person such that the division of the air flow in the region of the B-pillar of a motor vehicle is optimized.

Another preferred embodiment of the invention is provided in that upstream of the pivoting slats and the at least one fixed slat, as seen in the direction of airflow, further pivoting slats are arranged at a parallel distance from one another and can be pivoted simultaneously about a respective longitudinal axis and the longitudinal axes of which run transversely to the longitudinal axes of the slats which are downstream in the direction of flow. By this measure, the direction of the respective flow and therefore the flow-directing region can be additionally varied. In this case, it is particularly advantageous if the further pivoting slats are curved slats, the curvature of the slats running transversely to their respective longitudinal axis. The curved configuration of these slats brings about a better deflection of air in comparison to planar slats, which is advantageous, in particular, if the air-guiding nozzle is installed in the region of the B-pillar above the door ledge of a motor vehicle and the air is to be deflected from a duct running along the B-pillar toward an adjacent side window or toward the rear passengers.

Another preferred embodiment of the air-guiding nozzle according to the invention is provided in that the further pivoting slats can be pivoted through the use of an adjusting slide which is also used for adjusting the pivoting slats arranged at the air outlet, the adjusting slide being mounted displaceably on the pivoting slat or on one of the pivoting slats which, with regard to acting upon the vehicle side window, interact with the at least one fixed slat.

According to another feature of the invention, an air shutoff flap is disposed, as seen in a direction of airflow, upstream of the further pivoting slats and is configured to be rotatable or pivotable; the air outlet duct has an air passage cross section upstream of the air outlet; and the air shutoff flap has a shutoff position and closes the air passage cross section when in the shutoff position.

According to yet another feature of the invention, an adjusting wheel is operatively connected to the air shutoff flap; and the air shutoff flap is actuated via the adjusting wheel.

According to another feature of the invention, a flange-shaped front frame has a cutout formed therein; and the adjusting wheel is disposed in the cutout.

According to a further feature of the invention, the adjusting slide and/or the adjusting wheel has an actuating surface and studs provided on the actuating surface.

With the objects of the invention in view there is also provided, in combination with a B-pillar configuration having an opening formed therein and a vehicle side window adjacent to the opening, an air-guiding configuration, including:

an air-guiding nozzle mounted in the opening in the B-pillar configuration, wherein the air-guiding nozzle includes:
  an air outlet duct having an air outlet;
  at least one fixed slat disposed at the air outlet, the at least one fixed slat being configured to define a first discharge region for directing an air flow to the vehicle side window;
  a plurality of pivoting slats disposed at the air outlet, the pivoting slats being spaced apart from one another and being disposed substantially parallel to one another, the pivoting slats defining respective longitudinal axes and being simultaneously pivotable about the respective longitudinal axes, the pivoting slats and the at least one fixed slat extending substantially vertically;
  the pivoting slats being configured to define a second discharge region for directing an air flow toward a passenger area;
  the pivoting slats being dimensioned and disposed such that given ones of the pivoting slats, when in a maximum pivoting position, close the air outlet duct at the second discharge region; and
  at least one of the pivoting slats, when being in a maximum pivoting position, interacting with the at least one fixed slat such that the first discharge region is enlarged.

Other features which are considered as characteristic for the invention are set forth in the appended claims.

Although the invention is illustrated and described herein as embodied in an air-guiding nozzle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
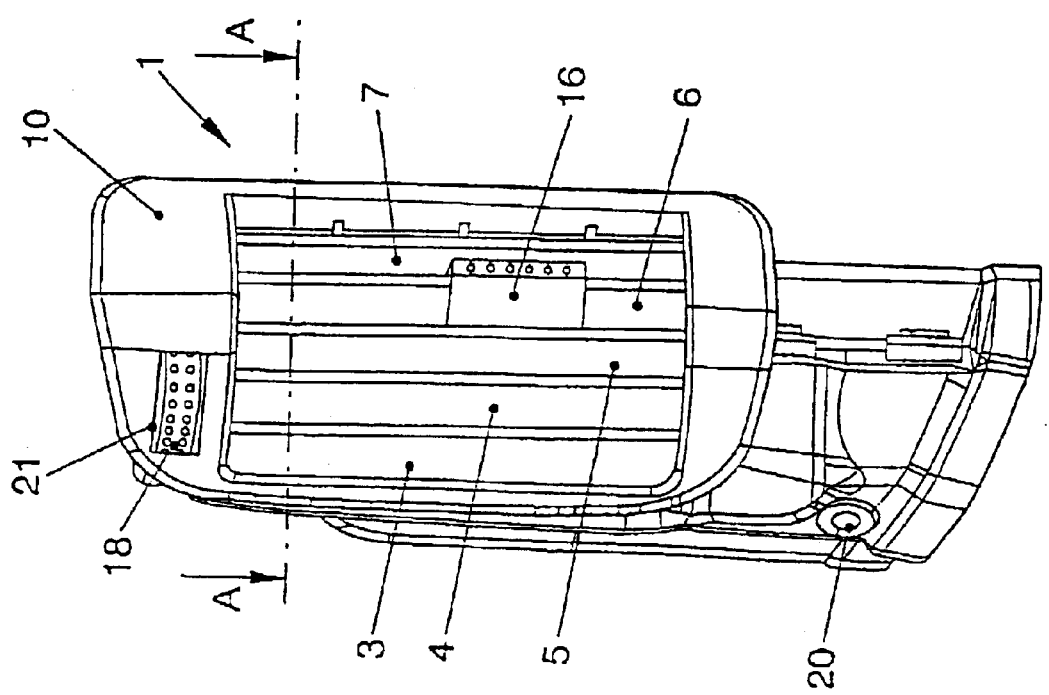
FIG. 1 is a diagrammatic front view of an air-guiding nozzle according to the invention for installation in the region of the B-pillar above the door ledge of a motor vehicle, wherein the pivoting slats of the nozzle that are disposed at the air outlet are in their closing position.

Referring now to the figures of the drawings in detail and first, particularly, to FIG. 1 thereof, there is shown an air guiding nozzle 1 which is embodied as a louver-type nozzle or "slatted" nozzle. It has a single air outlet duct 2, at the air outlet of which a plurality of pivoting slats 3, 4, 5, 6, which can be pivoted simultaneously about a respective longitudinal axis, and a fixed slat 7 are arranged at a parallel distance from one another. The pivoting slats 3, 4, 5, 6 and the fixed slat 7 each have an essentially straight cross-sectional profile. Their longitudinal axes are arranged essentially vertically when the air-guiding nozzle 1 is installed. The fixed slat 7 defines a discharge region 8 which is used for eliminating condensation from a vehicle side window or defrosting a vehicle side window which is only schematically indicated as a dash-dotted line 24 in FIG. 4. In contrast, the pivoting slats 3, 4, 5, 6 are used for directing the air flow toward a passenger area 23 or for cooling a person in the vehicle interior.

Figure 4:
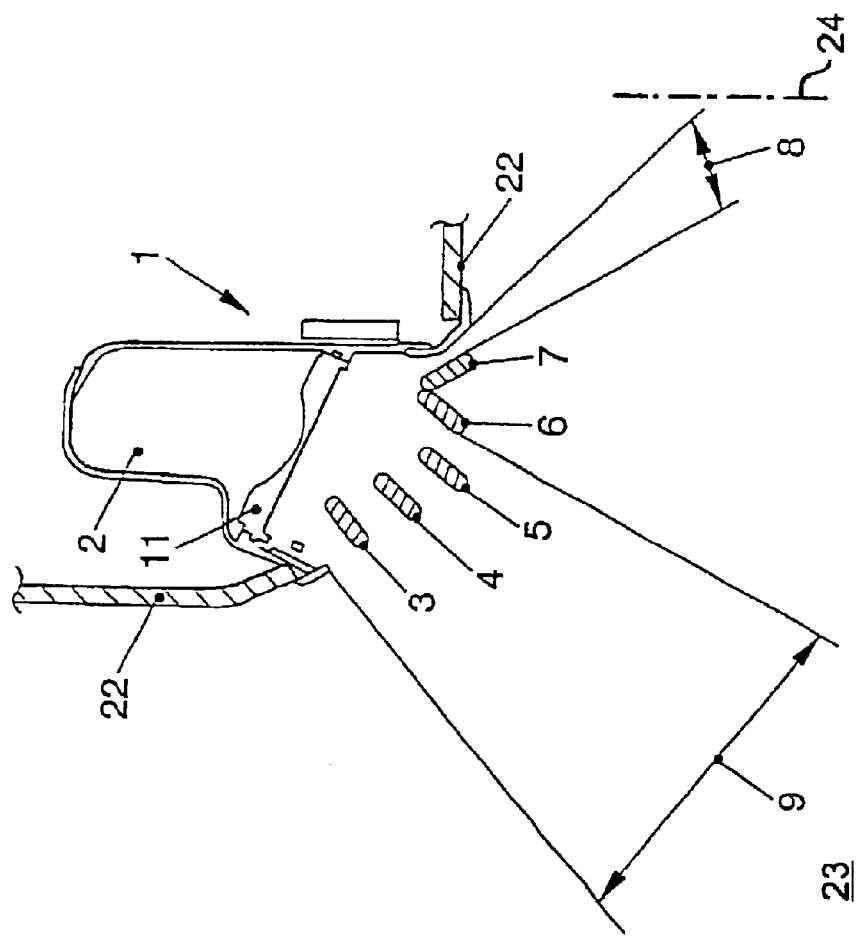
FIG. 4 is a diagrammatic, partial sectional view of an air-guiding nozzle according to the invention along section line A—A in FIG. 1, but with the pivoting slats disposed at the air outlet pivoted into an open position.
Figure 3:
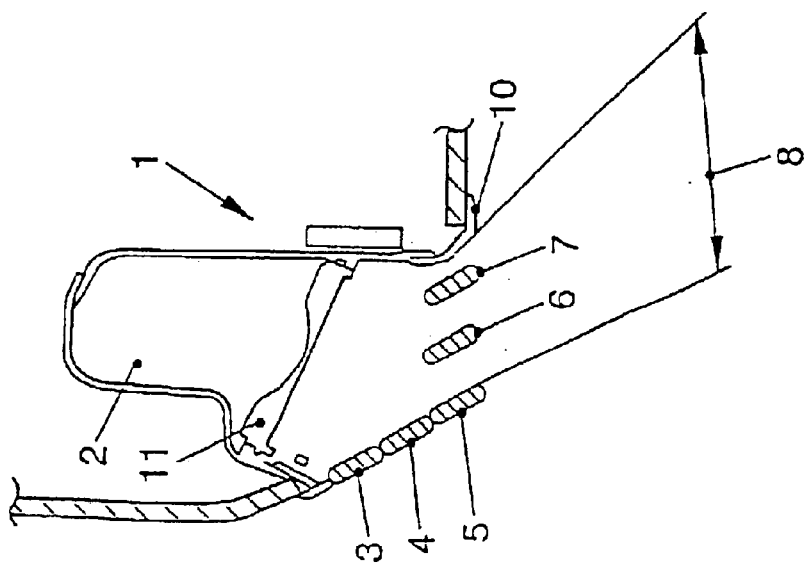
FIG. 3 is a diagrammatic, partial sectional view of an air-guiding nozzle according to the invention along section line A—A in FIG. 1.

With reference to FIGS. 3 and 4, it can be seen that the pivoting slats 3, 4, 5, 6 are dimensioned and arranged in such a manner that at maximum pivoting they close the air outlet duct 2 in a region 9 which is used for directing the flow toward a person in the vehicle interior. In the closing position, the pivoting slats 3, 4, 5 are arranged essentially flush. As an alternative, the pivoting slats 3, 4, 5 can also be configured in such a manner that they somewhat overlap at their longitudinal edges in the closing position, in which case two longitudinal edges come into contact in each case. The pivot axes of the pivoting slats 3, 4, 5 are situated essentially in one plane. In contrast, the pivot axis of the fourth pivoting slat 6 is situated between this plane and the plane in which the fixed slat 7 is arranged. Accordingly, the fourth pivoting slat and the adjacent third pivoting slat 5 do not come into contact in any of their pivoting positions.

If region 9 of the air-guiding nozzle 1 which is used for directing the flow toward a person is closed by the maximum pivoting of the pivoting slats 3, 4, 5, 6, the discharge region 8, which is used for acting upon the vehicle side window, is enlarged, as a comparison of FIGS. 3 and 4 shows. In the position of the pivoting slats according to FIG. 3, the opening bounded by the fixed slat 7 and the front frame 10 of the air-guiding nozzle 1, the front frame being configured as a flange-shaped frame, is supplemented by two openings which are bounded by the fixed slat 7 and the fourth pivoting slat 6 and by the fourth pivoting slat 6 and the third pivoting slat 5, respectively.

If, in contrast, the pivoting slats 3, 4, 5, 6 are pivoted into the open position shown in FIG. 4, then the discharge region 8 used for acting upon the vehicle side window is reduced to the opening bounded by the fixed slat 7 and the front frame 10 of the air-guiding nozzle 1, the front frame being configured as a flange-shaped frame. The pivoting slats 3, 4, 5, 6 then bound four openings which together form the discharge region 9 used for directing the flow toward a person, the fourth pivoting slat 6 coming into contact at its rear longitudinal edge with the rear longitudinal edge of the fixed slat 7. The lining of the B-pillar is denoted by 22.

Figure 2:
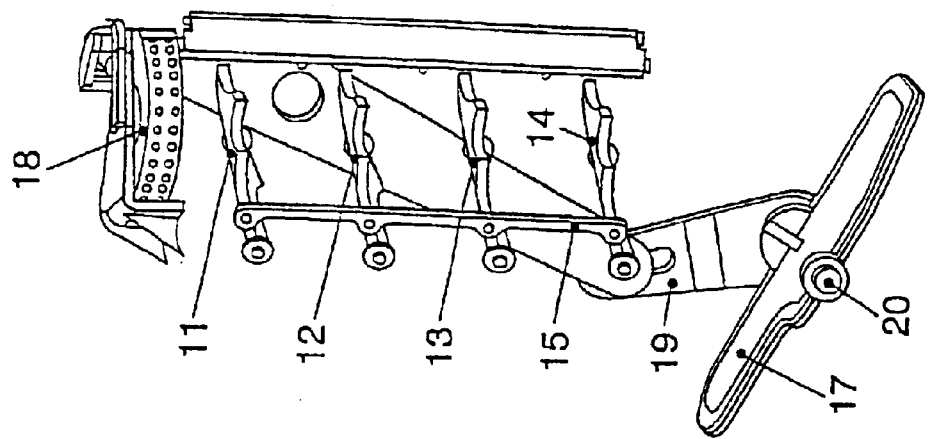
FIG. 2 is a diagrammatic perspective view of further pivoting slats which are provided upstream of the pivoting slats disposed at the air outlet, as seen in the direction of airflow, wherein the further pivoting slats can be pivoted simultaneously, and an air shutoff flap with an associated adjusting mechanism according to the invention.

As is shown in FIG. 2, upstream of the pivoting slats 3, 4, 5, 6 and of the fixed slat 7, as seen in the direction of airflow, further pivoting slats 11, 12, 13, 14 are arranged at a parallel distance from one another. The longitudinal and pivot axes of the pivoting slats 11, 12, 13, 14 run transversely to the longitudinal axes of the slats 3, 4, 5, 6, 7, only one slat of which is illustrated in FIG. 2 for the sake of clarity. The pivoting slats 11, 12, 13, 14 are coupled to one another by an articulated rod 15, so that they can likewise be pivoted simultaneously in the same manner as the pivoting slats 3, 4, 5, 6. It can be seen that the pivoting slats 11, 12, 13, 14 are formed to be curved, the curvature of the slats running transversely to their respective longitudinal axis. The pivoting slats 11, 12, 13, 14 are arranged in the air-guiding nozzle 1 in such a manner that their concave side faces the air inlet of the nozzle 1.

For the pivoting of the pivoting slats 3, 4, 5, 6, which are arranged at the air outlet, and of the curved pivoting slats 11, 12, 13, 14, which are arranged transversely thereto, a common adjusting element is provided in the form of an adjusting slide 16 which is mounted on the fourth pivoting slat 6 in a manner such that it can be displaced along the longitudinal axis thereof (cf. FIG. 1). In this case, the adjusting slide 16 is coupled to the two sets of pivoting slats in such a manner that through by a longitudinal displacement of the adjusting slide 16 parallel to the fixed slat 7, the curved pivoting slats 11, 12, 13, 14 can be adjusted about their pivot axes, in each case by the same pivoting angle, and, through a substantially horizontal or transverse displacement of the adjusting slide 16 at right angles thereto, i.e. essentially horizontally, the pivoting slats 3, 4, 5, 6 arranged at the air outlet can be adjusted by the same pivoting angle in each case.

The air-guiding nozzle 1 is furthermore provided with a rotatable air shutoff flap 17 which is arranged upstream of the pivoting slats 11, 12, 13, 14, as seen in the direction of airflow, and, in its shutoff position, closes the air passage cross section leading to the air outlet. In order to actuate the air shutoff flap 17, an adjusting wheel 18 is provided which acts on the air shutoff flap via an articulated mechanism 19. The axis of rotation of the air shutoff flap 17 is denoted by 20. A portion of the adjusting wheel 18 protrudes through a cutout 21 in the flange-like front frame 10 of the air-guiding nozzle 1. The adjusting wheel 18 and the adjusting slide 16 each have studs on their actuating surfaces. These studs facilitate the control and the feel of the adjusting wheel 18 and of the adjusting slide 16 in poor light conditions or darkness.

The invention is not restricted to the above-described exemplary embodiment. Rather, a number of variants which also make use of the basic concept of the invention in a different form is conceivable.

I claim:

1. An air-guiding nozzle for defrosting a vehicle side window and ventilating a vehicle interior, comprising:

an air outlet duct having an air outlet;

at least one fixed slat disposed at said air outlet, said at least one fixed slat being configured to define a first discharge region for directing an air flow to a vehicle side window;

a plurality of pivoting slats disposed at said air outlet, said pivoting slats being spaced apart from one another and being disposed substantially parallel to one another, said pivoting slats defining respective longitudinal axes and being simultaneously pivotable about said respective longitudinal axes;

said pivoting slats being configured to define a second discharge region for directing an air flow toward a passenger area;

said pivoting slats being dimensioned and disposed such that given ones of said pivoting slats, when in a maximum pivoting position, close said air outlet duct at said second discharge region; and at least one of said pivoting slats, when being in a maximum pivoting position, interacting with said at least one fixed slat such that said first discharge region is enlarged.

2. The air-guiding nozzle according to claim 1, wherein said longitudinal axes of said given ones of said pivoting slats are substantially disposed in a single plane.

3. The air-guiding nozzle according to claim 1, including:

further pivoting slats disposed, as seen in a direction of airflow, upstream of said pivoting slats and said at least one fixed slat; and said further pivoting slats being spaced apart from one another and being disposed substantially parallel to one another, said further pivoting slats defining respective further longitudinal axes and being simultaneously pivotable about said respective further longitudinal axes, said further longitudinal axes extending transverse to said longitudinal axes of said pivoting slats.

4. The air-guiding nozzle according to claim 3, wherein said further pivoting slats are curved slats with a radius of curvature extending transverse to said respective further longitudinal axes.

5. The air-guiding nozzle according to claim 3, including:

an adjusting slide displaceably mounted on said at least one of said pivoting slats interacting, when in the maximum pivoting position, with said at least one fixed slat;

said further pivoting slats being pivotable via said adjusting slide; and said pivoting slats being adjustable via said adjusting slide.

6. The air-guiding nozzle according to claim 3, including:

an air shutoff flap disposed, as seen in a direction of airflow, upstream of said further pivoting slats and configured to be one of rotatable and pivotable;

said air outlet duct having an air passage cross section upstream of said air outlet; and said air shutoff flap having a shutoff position and closing said air passage cross section when in said shutoff position.

7. The air-guiding nozzle according to claim 6, including:

an adjusting wheel operatively connected to said air shutoff flap; and said air shutoff flap being actuated via said adjusting wheel.

8. The air-guiding nozzle according to claim 7, including:

a flange-shaped front frame having a cutout formed therein; and said adjusting wheel being disposed in said cutout.

9. The air-guiding nozzle according to claim 5, wherein said adjusting slide has an actuating surface and studs provided on said actuating surface.

10. The air-guiding nozzle according to claim 7, wherein said adjusting wheel has an actuating surface and studs provided on said actuating surface.

11. In combination with a B-pillar configuration having an opening formed therein and a vehicle side window adjacent to the opening, an air-guiding configuration, comprising:

an air-guiding nozzle mounted in the opening in the B-pillar configuration, said air-guiding nozzle including:

an air outlet duct having an air outlet;

at least one fixed slat disposed at said air outlet, said at least one fixed slat being configured to define a first discharge region for directing an air flow to the vehicle side window;

a plurality of pivoting slats disposed at said air outlet, said pivoting slats being spaced apart from one another and being disposed substantially parallel to one another, said pivoting slats defining respective longitudinal axes and being simultaneously pivotable about said respective longitudinal axes, said pivoting slats and said at least one fixed slat extending substantially vertically;

said pivoting slats being configured to define a second discharge region for directing an air flow toward a passenger area;

said pivoting slats being dimensioned and disposed such that given ones of said pivoting slats, when in a maximum pivoting position, close said air outlet duct at said second discharge region; and at least one of said pivoting slats, when being in a maximum pivoting position, interacting with said at least one fixed slat such that said first discharge region is enlarged.

* * * * *